United States Patent [19]

Gramberger et al.

[11] Patent Number: 5,105,522
[45] Date of Patent: Apr. 21, 1992

[54] PROCESS OF MANUFACTURING A FRICTION RING PROVIDED WITH A SINTER-BONDED FRICTION FACING

[75] Inventors: Johann Gramberger, Wolfsegg; Roitner Franz, Laakirchen, both of Austria

[73] Assignee: Miba Sintermetall Aktiengesellschaft, Laakirchen, Austria

[21] Appl. No.: 500,792

[22] Filed: Mar. 28, 1990

[30] Foreign Application Priority Data

Mar. 30, 1989 [AT] Austria ................. 738/89

[51] Int. Cl.$^5$ ............................. B23P 25/00
[52] U.S. Cl. ........................ 29/458; 29/460; 192/107 M
[58] Field of Search ............ 29/458, 460, 428; 72/359; 192/107 M, 53 F

[56] References Cited

U.S. PATENT DOCUMENTS

| | | | |
|---|---|---|---|
| 3,034,383 | 5/1962 | Schulte et al. | 72/359 |
| 4,071,127 | 1/1978 | Suzuki | 72/359 X |
| 4,267,912 | 5/1981 | Bauer et al. | 192/107 M X |
| 4,679,681 | 7/1987 | Creydt et al. | 192/107 M |
| 4,770,283 | 9/1988 | Pütz et al. | 192/107 M |
| 4,917,743 | 4/1990 | Gramberger et al. | 192/107 M X |
| 4,940,847 | 7/1990 | Gramberger | 192/107 M X |
| 4,944,378 | 7/1990 | Christian | 192/107 M |

FOREIGN PATENT DOCUMENTS 385826 3/1986 Austria.

Primary Examiner—Timothy V. Eley
Assistant Examiner—C. Richard Martin
Attorney, Agent, or Firm—Collard, Roe & Galgano

[57] ABSTRACT

To make a friction ring which is intended to be used in clutches or brakes and has a sinter-bonded friction facing, an annular blank is blanked from flat sheet metal and is provided with a sinter-bonded friction facing. Thereafter the blank provided with the sintered friction facing is shaped to form a conical or cylindrical friction ring and grooves distributed around the periphery of the friction facing are embossed into the friction facing at the same time. In order to ensure that that shaping operation will result in an adequate dimensional accuracy, the operation to emboss the grooves into the friction facing is carried out in such a manner that the backing ring is similarly embossed.

3 Claims, 2 Drawing Sheets

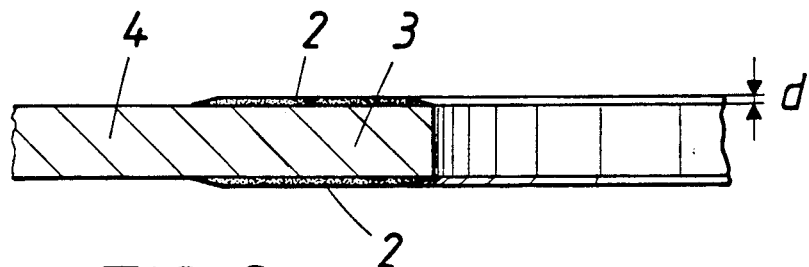
FIG.1
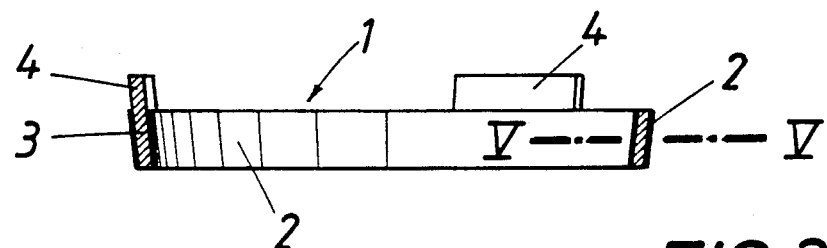
FIG.2
FIG.3
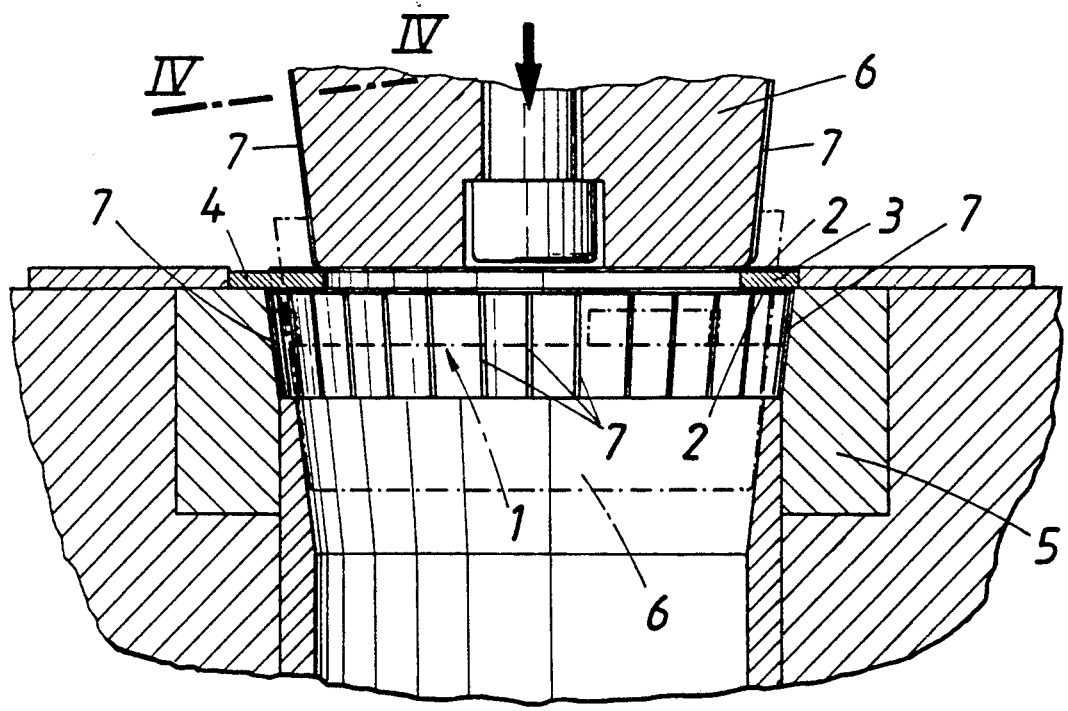

PROCESS OF MANUFACTURING A FRICTION RING PROVIDED WITH A SINTER-BONDED FRICTION FACING

BACKGROUND OF THE INVENTION

1. Field of the Invention

This invention relates to a process of manufacturing a friction ring, which is intended for use in clutches or brakes and comprises a conical or cylindrical backing ring, which constitutes a hollow solid of revolution having inside and outside peripheral surfaces, and on at least one of said peripheral surfaces is provided with a sinter-bonded friction facing. In that process a blank for making the backing ring is blanked from flat sheet metal and is provided with a sinter-bonded friction facing, the backing ring provided with the sinter-bonded facing is deeply drawn to form a conical or cylindrical friction ring and the friction facing is embossed at the same time and is transformed with grooves distributed around the periphery of said facing.

2. Description of the Prior Art

It is known from U.S. Pat. No. 4,770,283 that friction rings which are intended for use in clutches or brakes and have a cylindrical or conical friction surface may comprise a friction facing which is directly sinter-bonded to a backing ring and that such friction rings can be made in that a blank for forming the backing ring is blanked from flat sheet metal and is provided with the sinter-bonded friction facing on at least one of its broadsides which are intended to constitute the conical or cylindrical peripheral surfaces of the backing ring, and only thereafter is the blank shaped between the die and a punch of a shaping tool set so that a friction ring having the desired conical or cylindrical shape is obtained. To ensure that the sinter-bonded friction facing will not adversely be affected by that shaping operation, angularly spaced apart embossing ribs are provided on the peripheral shaping surface of the punch and/or die of the shaping tool set so that the friction facing will be compacted and formed with grooves adjacent to said ribs but the friction facing will not be compacted in the spaces between adjacent embossing ribs. As a result the sinter-bonded friction facing will not undesirably be compacted as the backing ring is deformed. In spite of said measure such friction rings have not proved satisfactory in practice because the required dimensional accuracy, particularly as regards the circularity and the true running of the ring, cannot consistently be ensured under the conditions of mass production. In that connection it must be borne in mind that the backing ring is usually made from a sheet steel blank, which is subjected to a heat treatment as the friction facing is sinter-bonded to the blank, and said heat treatment will necessarily result in a loss of strength of the blank so that the dimensional accuracy which can be achieved during the succeeding shaping step will adversely be affected.

SUMMARY OF THE INVENTION

For this reason it is an object of the invention so to improve with simple means the process which has been described first hereinbefore and serves to manufacture a friction ring that an adequate dimensional accuracy of the shaped backing ring will be ensured even under the conditions encountered during mass production whereas an expensive subsequent machining is not required.

That object is accomplished in accordance with the invention in that the operation by which the grooves are embossed into the friction facing is carried out in such a manner that the backing ring is similarly deformed at the same time.

That simple measure does not require an additional operation because it is sufficient to emboss the groove to a larger depth. As a result, the compliance with specifications calling for close limits of the circularity of the friction ring and of its true running will be ensured without a need for a subsequent machining of the friction ring by a sizing tool in an additional operation, as has been attempted with only a small success in the prior art. It is apparent that the cold working resulting from the embossing of the grooves into the backing ring is sufficient to restore the strength of the backing ring to such a degree that the required dimensional accuracy will be ensured.

It will be understood that the extent to which the backing ring is deformed as the grooves are embossed will determine the degree to which the strength of the backing ring will be increased and the dimensional accuracy of the backing ring which has been shaped by embossing and deep drawing. Desirable results for most applications will usually be produced if the backing ring has a usual wall thickness of 2 to 3 mm and the grooves which are embossed into the backing ring have a depth of at least 0.02 mm. The upper limit of the depth of the grooves embossed into the backing ring may usually be 0.1 mm. It must be borne in mind that in spite of that additional deformation of the backing ring the circularity of the conical or cylindrical friction surface must not adversely be affected.

In addition to the depth of the grooves which have been embossed into the backing ring, the number or distribution of said grooves will also influence the degree to which the strength of the backing ring is increased by its deformation. Embossed grooves in both peripheral surfaces of the backing ring may be arranged in either of two patterns because each groove in one peripheral surface of the backing ring may register with or may be offset from an adjacent groove in the other peripheral surface. Different results will be produced in the backing ring by said two patterns. In the former case a larger local deformation will be effected because adjacent grooves register with each other. In the second case the deformation will more uniformly be distributed around the periphery and an additional bending stress will arise between adjacent grooves.

As has been explained hereinbefore the embossing of the grooves into the backing ring as it is deformed does not give rise to a need for an additional operation. A conventional shaping tool set comprising tools consisting of a die and a punch may be used, if at least one of said tools carries embossing ribs for forming grooves in the friction facing and the height of said embossing ribs exceeds the thickness of the friction facing so that said grooves will be embossed also into the backing ring as grooves are embossed into the friction facing.

BRIEF DESCRIPTION OF THE DRAWING

FIG. 1 is an enlarged transverse sectional view showing an annular blank which has been provided with a friction facing on both broadsides.

FIG. 2 is an axial sectional view showing the friction ring which has been shaped.

FIG. 3 is a simplified axial sectional view showing a shaping tool set for shaping the annular blank provided with a sinter-bonded facing.

DETAILED DESCRIPTION OF THE PREFERRED EMBODIMENTS

Figure 4:
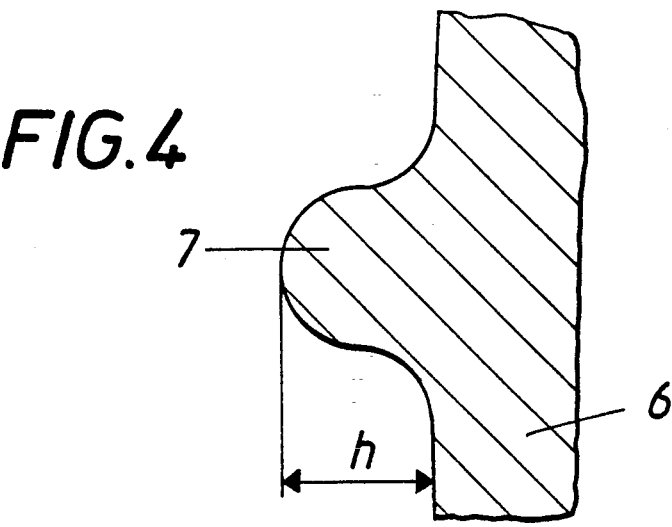
FIG. 4 is an enlarged fragmentary sectional view taken on line IV—IV in FIG. 3 and showing a portion of the punch of the shaping tool set.

The process of manufacturing a friction ring in accordance with the invention will now be explained in more detail with reference to the drawing.

In the friction ring 1 which is to be made, a friction facing 2 is directly sinter-bonded to a backing ring 3, which is integrally formed with a cam 4 for a coupling of the friction ring 1 when it has been installed in a brake or clutch. To make the backing ring 3, an annular blank 3 is blanked from flat sheet steel and is provided with a scatter-sintered friction facing 2 on one broad side and then on the opposite broad side, as is apparent from FIG. 1. Only when the friction facings 2 have been sinter-bonded to the annular blank 3 is the latter shaped by embossing and deep drawing to assume the conical shape shown in FIG. 2 which is desired for the friction ring 1. This is effected by means of a shaping tool set which is illustrated in FIG. 3 and substantially comprises tools consisting of a die 5 and a punch 6 for cooperating with said die. When the blank provided with the sinter-bonded friction facing has been placed into the die 5, the punch 6 is operated to draw the blank from the plane of the sheet metal to assume the conical shape that is desired for the friction ring 3, as is indicated in phantom in FIG. 3. Each of the two tools 5 and 6 of the shaping tool set has a peripheral shaping surface, which is arranged to face the other tool of the set in the use thereof and is provided with embossing ribs 7, which protrude toward the workpiece and one of which is shown on a larger scale in FIG. 4. Because the height h of said embossing ribs 7 exceeds the thickness d of the friction facing 2, the grooves 8 which are formed by the action of said embossing ribs 7 as the blank is drawn to form the backing ring 3 are embossed not only in the friction facing 2 but also in the backing ring 3, which is thus deformed. This results in a coldworking of the backing ring 3 so that the conical friction ring which has been formed will have a high dimensional accuracy particularly as regards its circularity and its true running. The depth t of the grooves 8 formed in the backing ring is desirably between 0.02 and 0.1 mm and this must be taken into account in the selection of a suitable height h of the embossing ribs 7 in consideration of the thickness of the friction facing which has been compacted adjacent to the embossing ribs.

Figure 5:
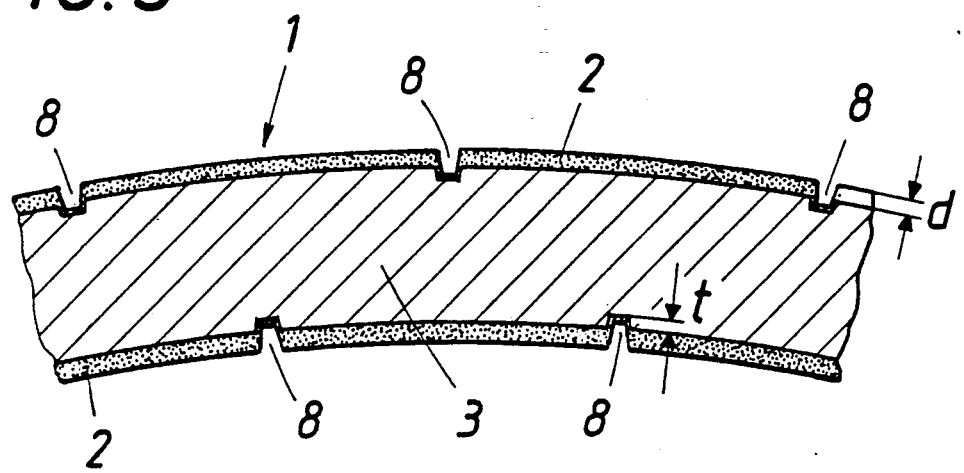
FIG. 5 is an enlarged sectional view taken on line V—V in FIG. 2.
Figure 6:
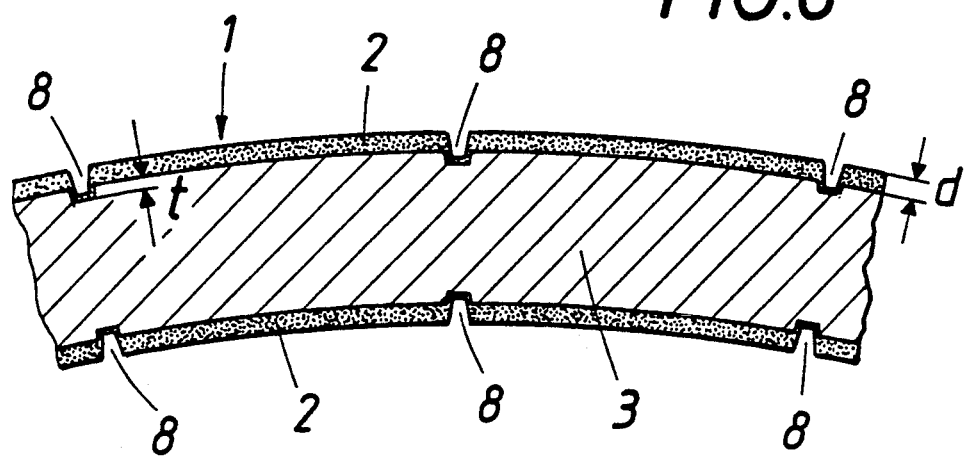
FIG. 6 is a view that is similar to FIG. 5 and shows a modified friction ring.

The grooves 8 serve to conduct oil during the operation of the friction ring and are preferably provided in the outside and inside peripherial surfaces of the conical backing ring 3. But the dimensional accuracy of the friction ring will appreciably be improved even by the embossing of grooves into the backing ring only in one peripheral surface thereof. If grooves are embossed into both peripheral surfaces of the backing ring, adjacent grooves on opposite sides may be angularly offset, as is shown in FIG. 5, or may be in register, as is shown in FIG. 6. These different groove patterns will produce different results as regards the increase of the strength of the backing ring 3 so that the selection of the groove pattern will allow for different conditions of use.

We claim:

1. A process of manufacturing a one-piece friction ring comprised of a backing ring consisting of a hollow solid of revolution having inside and outside peripheral surfaces and a friction facing on at least one of said peripheral surfaces, comprising the steps of
   (a) stamping an annular blank having two broadsides from a flat metal sheet,
   (b) sinter-bonding the friction facing to at least one of the broadsides of the blank, and
   (c) in a single operation simultaneously deep-drawing the blank to which the friction facing has been sinter-bonded to form the backing ring and embossing the friction facing and only the underlying peripheral surface of the backing ring to form grooves distributed about the periphery of the friction ring and without otherwise deforming the backing ring, the grooves extending through the friction facing and into the backing ring to a depth of at least 0.02 mm and not in excess of 0.1 mm.

2. The process of claim 1, wherein a respective one of the friction facings is sinter-bonded to both broadsides of the blank whereby the inside and outside peripheral surfaces of the backing ring underlie the respective friction faces, the friction faces and the underlying peripheral surfaces being embossed to form said grooves, the grooves distributed along the inside peripheral surface being peripherally staggered from the grooves distributed along the outside peripheral surface.

3. The process of claim 1, wherein a respective one of the friction facings is sinter-bonded to both broadsides of the blank whereby the inside and outside peripheral surfaces of the backing ring underlie the respective friction faces, the friction faces and the underlying peripheral surfaces being embossed to form said grooves, the grooves distributed along the inside peripheral surface being peripherally in line with the grooves distributed along the outside peripheral surface.

* * * * *